(12) United States Patent
Lazarus et al.

(10) Patent No.: US 10,351,724 B1
(45) Date of Patent: Jul. 16, 2019

(54) COATING SYSTEMS AND FORMULATIONS WITH HIGH HIDE AND HOLDOUT

(71) Applicant: JAMES HARDIE TECHNOLOGY LIMITED, Dublin (IE)

(72) Inventors: Richard M. Lazarus, Temescal Valley, CA (US); John Andrew Joecken, Palm Springs, CA (US); Caidian Luo, Rancho Cucamonga, CA (US)

(73) Assignee: James Hardie Technology Limited, Dublin (IE)

( * ) Notice: Subject to any disclaimer, the term of this patent is extended or adjusted under 35 U.S.C. 154(b) by 328 days.

(21) Appl. No.: 15/188,715

(22) Filed: Jun. 21, 2016

(51) Int. Cl.
| | |
|---|---|
| *C09D 7/61* | (2018.01) |
| *C09D 133/02* | (2006.01) |
| *C08K 3/34* | (2006.01) |
| *C08K 3/22* | (2006.01) |
| *C08K 3/26* | (2006.01) |
| *C04B 41/63* | (2006.01) |
| *C08K 3/20* | (2006.01) |

(52) U.S. Cl.
CPC ............ *C09D 133/02* (2013.01); *C04B 41/63* (2013.01); *C09D 7/61* (2018.01); *C08K 3/20* (2013.01); *C08K 3/22* (2013.01); *C08K 3/26* (2013.01); *C08K 3/34* (2013.01); *C08K 3/346* (2013.01); *C08K 2003/2241* (2013.01); *C08K 2003/2272* (2013.01); *C08K 2003/265* (2013.01)

(58) Field of Classification Search
CPC ...... C08K 2003/2241; C08K 2003/265; C08K 3/346; C09D 7/61
See application file for complete search history.

(56) References Cited

U.S. PATENT DOCUMENTS

| | | | |
|---|---|---|---|
| 7,611,575 B2* | 11/2009 | Sare .......................... | C09D 7/69 106/678 |
| 2007/0123629 A1* | 5/2007 | Sare .......................... | C08K 3/34 524/451 |
| 2015/0080521 A1 | 3/2015 | Korenkiewicz et al. | |

OTHER PUBLICATIONS

Jason Wai Pan Boke's Project Report, Jun. 2013, California Polytechnic State University, San Luis Obispo.*
Gamaco Datasheet, downloaded 2018.*

\* cited by examiner

*Primary Examiner* — Vu A Nguyen
(74) *Attorney, Agent, or Firm* — Knobbe, Martens, Olson & Bear, LLP

(57) ABSTRACT

Coating formulations for improving hide and holdout without sacrificing adhesion on cementitious substrates are provided. The coating formulations can achieve high hide and holdout with a low pigment volume concentration by utilizing particles with pre-selected oil absorption and particle size range. The coating formulations can be used as a functional for fiber cement substrates. When applied in combination with a top coat, the functional provides provide high hide and hold and enhanced adhesion while reducing pigment loading.

13 Claims, 1 Drawing Sheet

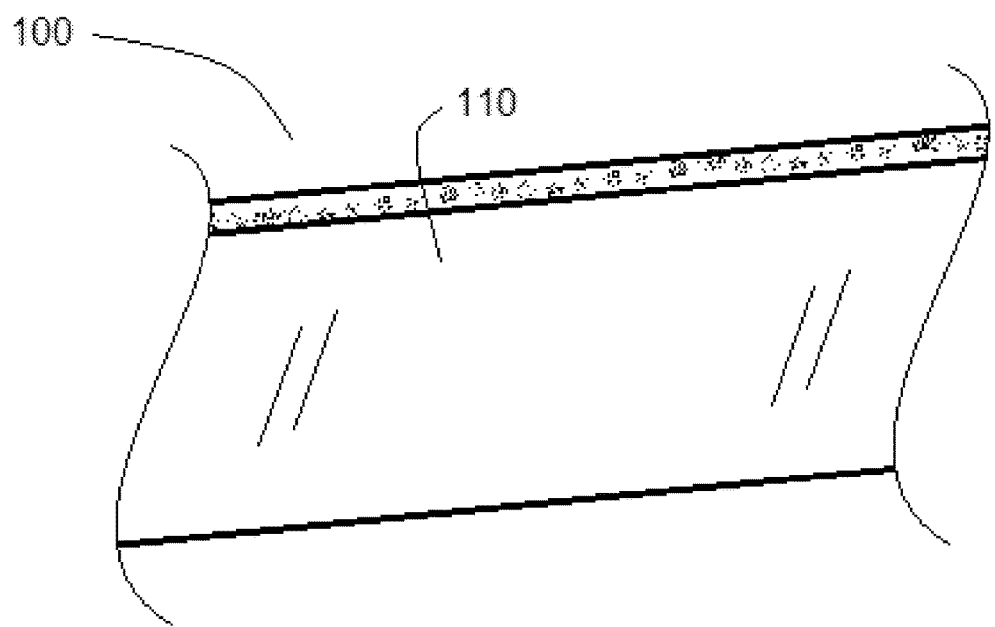

COATING SYSTEMS AND FORMULATIONS WITH HIGH HIDE AND HOLDOUT

BACKGROUND

Field

The present disclosure relates generally to coating systems for building materials, and in particular, to surface coating systems and formulations that can improve hide and holdout.

Description of the Related Art

Surface coating systems, such as those comprising, for example, a primer and top coat are often applied to building materials to protect the exterior surface from the environment and improve the aesthetics of the building structure. Hide and holdout are performance characteristics of such a coating system. Hide and holdout affect the quality and appearance of a coated surface. Hide refers to the ability of the coating system to hide any discoloration or stains on the substrate surface. Holdout refers to the ability of the coating system to prevent the top coat from soaking through the substrate surface. Coating systems with good hide and holdout produce coated surfaces with more uniform color and gloss without requiring multiple layers of top coat.

High hide and holdout are difficult to achieve when such a coating system is applied to substrates made of fiber cement. Conventional primer compositions do not adequately mask the discolorations, stains, or other irregularities often present on cementitious substrates. Fiber cement substrates, in particular, when primed with conventional primers often appear poorly primed or un-primed. Top coats also tend to soak through cementitious substrates which could result in uneven paint gloss and color.

A conventional solution for improving hide and holdout for cementitious substrates is to increase the pigment loading in the primer so as to hide the imperfections on the substrate surface. However, primers with higher pigment loading not only are costly but often exhibit poor adhesion to the substrates. Thus, there is a need for an improved surface coating system with high hide and holdout without sacrificing adhesion.

SUMMARY

Accordingly, disclosed herein are improved coating systems and formulations for cementitious composite materials that can achieve an appropriate balance between high hide and holdout while maintaining strong adhesion.

In a first application, a coating formulation for cementitious substrates can include at least one functional pigment, the functional pigment including particles having a selected particle size range and oil absorption value; at least one filler, wherein the at least one filler comprises an extender that separates and spreads out the particles of the functional pigment; at least one polymer, wherein the at least one polymer comprises an acrylic polymer, and a selected pigment volume concentration. Such formulations maintain high opacity upon application to a substrate. In some embodiments of the first application, the functional pigments and fillers are selected for certain particle size and oil absorption. In further embodiments, the at least one functional pigment is maintained at certain loadings to control the cost of the formulation without sacrificing hide or holdout. In further embodiments of the first application, the coating formulation further comprises one or more additives, such as, for example, one or more of rheology modifiers, dispersants, mar and slip additives, surfactants, defoamers, buffers, preservatives, stain blockers, coalescents, flash rust inhibitors, freeze-thaw stabilizers and/or biocides.

In a second application, a waterborne functional composition includes selected proportions of functional pigments, fillers, and polymers. In some embodiments of the second application, pigment volume concentration is controlled to provide a balanced formulation. In further embodiments, particle sizes are selected to provide a formulation with strong mechanical properties while maintaining hide and holdout.

In a third application, a cementitious substrate is coated with a waterbourne functional composition on at least one surface; the functional composition includes selected proportions of fillers, acrylic polymer, functional pigments, and additives, and the functional composition is characterized by a selected pigment volume concentration, providing a coating with good topcoat wet adhesion.

In a fourth application, a cementitious substrate is coated with a coating formulation comprising at least one functional pigment, the functional pigment including particles having a selected particle size range and oil absorption value; at least one filler, wherein the at least one filler comprises an extender that separates and spreads out the particles of the functional pigment; at least one polymer, wherein the at least one polymer comprises an acrylic polymer, and a selected pigment volume concentration.

It is to be understood that the foregoing summary is illustrative only and is not intended to be in any way limiting. In addition to the illustrative aspects, embodiments and features described above, further aspects, embodiments and features will become apparent by reference to the drawings and following detailed description.

BRIEF DESCRIPTION OF THE DRAWINGS

FIG. 1 shows an example of a cementitious substrate having a coating formulation according to one embodiment of the invention.

DETAILED DESCRIPTION

In the following detailed description, reference is made to the accompanying drawing, which form a part hereof. In the drawing, similar symbols typically identify similar components, unless context dictates otherwise. The illustrative embodiments described in the detailed description and drawings are not meant to be limiting. Other embodiments may be used, and other changes may be made, without departing from the spirit or scope of the subject matter presented here. It will be readily understood that the embodiments of the present disclosure, as generally described herein, and illustrated in the FIGURES, can be arranged, substituted, combined, and designed in a wide variety of different configurations, all of which are explicitly contemplated and made part of this disclosure.

The present disclosure generally describes improved coating systems and coating formulations for cementitious composite materials that can achieve an appropriate balance between high hide and holdout while maintaining strong adhesion. In one embodiment, the coating systems and coating formulations can be used as an effective primer for cementitious substrates. Primers made according to the coating formulations described herein when applied to a fiber cement substrate achieve a uniform coating. In addition when the coating formulations described herein are applied in conjunction with top coats, the combination of coating layers achieves a uniform coating and finished look while requiring fewer coats. The coating formulations generally include functional pigments, at least one filler, and one or more polymers, each of which have pre-selected properties and together can form a uniform film with strong adhesion to cementitious substrates. In various embodiments, the coating formulations have low pigment loading in combination with low oil absorption particles in a pre-selected particle size range. The present disclosure reveals that, surprisingly, the pigment volume concentration (PVC) of a formulation can be selected in correspondence with the oil absorption of the pigment to achieve good hide and holdout on cementitious substrates without sacrificing adhesion.

In some embodiments, the coating formulation comprises up to 12 wt % of at least one functional pigment, up to 27 wt % of at least one polymer, and up to 75 wt % of at least one filler, where the PVC can be between about 20% and about 70%. In general, the sum of the wt % of total functional pigments, wt % of total polymer, wt % of total fillers, and wt % of total additives in the coating formulation cannot exceed 100%. The functional pigment(s) can have an oil absorption value of less than 30 and an average particle size of between 0.1 µm to 0.5 µm. The coating formulation may further comprise additives to enhance various properties as described in greater detail herein.

In some embodiments, the coating formulation comprises about 1 to about 11 wt % of functional pigments, about 19 to about 27 wt % polymers, about 60 to about 75 wt % of fillers, such that the sum of the wt % of total functional pigments, wt % of total polymer, wt % of total fillers is between 85 wt % and 94 wt %; the coating formulation further comprises about 3 to about 7 wt % of one or more additives, such that the sum of the wt % of total functional pigments, wt % of total polymer, wt % of total fillers, and wt % of total additives in a formulation cannot exceed 100%; and wherein the PVC of the coating formulation is between about 40% and about 60%.

In some embodiments, the functional pigments can have an oil absorption value of less than 30 and an average particle size of between 0.1 µm to 0.5 µm.

Functional Pigments

In various embodiments, the at least one functional pigment may be selected from pigments having particles with sufficiently low affinity to the polymers such that the pigment particles do not substantially interfere with polymer film formation and yet can still adequately disperse in the coating. The at least one functional pigment may also be selected from pigments having particles which are sized and shaped such that the pigment particles can provide the requisite opacity at reduced pigment loading and can increase mechanical bonding with the top coat. The at least one functional pigments may include a metal oxide, such as $TiO_2$, yellow $Fe_2O_3$, black $Fe_2O_3$, or a combination of these. In some embodiments, the pigment particles may be pre-treated with various inorganic surface treatments, including silica and alumina. In some embodiments, the at least one functional pigment has a low oil absorption value, preferably between about 17 and about 30, which is selected to minimize interference with polymer film formation. In some embodiments, the at least one functional pigment includes a combination of pigment particles having different oil absorption values. In one implementation, the at least one functional pigment includes $TiO_2$ having an oil absorption value of about 17 and particle size range of about 0.1 µm to about 0.2 µm; and $TiO_2$ having an oil absorption value of about 22 and particle size of about about 0.5 µm. Oil absorption can be measured by the Gardner-Coleman method, according to ASTM D1483-95. In some embodiments, the particle size of the at least one functional pigment is between about 0.1 µm to about 0.5 µm. The pigment particle size may improve adhesion by enhancing mechanical bonding with adjacent coating layers, such as between a primer and a top coat. In some embodiments, the at least one functional pigment includes a combination of pigment particles having different sizes ranging between about 0.1 µm to about 0.5 µm. In various embodiments, functional pigments may be selected from those given in Table 1.

TABLE 1

| Pigment | Mineral | Form | Mean Particle Size (µm) | Oil Absorption (g oil/100 g pigment) |
|---------|---------|------|-------------------------|--------------------------------------|
| A | $TiO_2$ | Rutile | 0.1 to 0.2 | 17 |
| B | $TiO_2$ | Rutile | 0.1 to 0.4 | 17 |
| C | $TiO_2$ | Rutile | 0.5 | 22 |
| D | $Fe_2O_3$ | Yellow | 0.1 | 30 |
| E | $Fe_2O_3$ | Black | 0.2 | 21 |

Polymers

In various embodiments, the at least one polymer may be selected to provide a uniform film over a cementitious substrate surface, and minimize the number and size of pores or gaps that penetrate the depth of a surface coating. As provided herein, the polymer can include a single monomer or more than one monomer, and can be a copolymer such as a block or graft copolymer. The at least one polymer may include 100% acrylic, styrene acrylic, styrene butadiene, alkyd, styrene, or aliphatic urethane acrylic. In some embodiments, the at least one polymer as provided herein may be characterized by an all-acrylic backbone, as a 100% acrylic polymer, or an acrylic polymer that is substantially free from other polymers, and other monomers. Desirably, the at least one polymer will exhibit an MFFT of less than about 20° C. In some embodiments, the at least one polymer may crosslink under ambient conditions. In further embodiments, the at least one polymer is selected such that it will not crosslink under UV irradiation, and will not crack on exposure to sunlight. In some embodiments the at least one polymer is an ambient self-cross linking polymer. In some embodiments, the at least one polymer has a solid % wt between 43% and 46% wt. In various embodiments, the at least one polymer may be selected from those given in Table 2.

TABLE 2

| Polymer | Characteristics | Solids % Wt. | $T_G$ (° C.) |
|---------|-----------------|--------------|--------------|
| A | Self-crosslinking Styrene Acrylic copolymer (SCL) | 44 | |
| B | Self-crosslinking Styrene Acrylic (SCL) | 44 | ≤80 |
| C | 100% Acrylic-Ambient Cross linking (forms a polymer-pigment composite) | 46 | ≤25 |
| D | Ultra-small particle size hydrophobic modified acrylic | 45 | ≤25 |
| E | Alkyd 1% solvent | | |
| F | Short oil waterborne alkyd emulsion | 50 | N/A |

TABLE 2-continued

| Polymer | Characteristics | Solids % Wt. | $T_G$ (° C.) |
|---|---|---|---|
| G | Styrene Butadiene | 49 | ≤50 |
| H | Styrene Acrylic | 46 | ≤50 |
| I | Self-crosslinking aliphatic urethane/acrylic (SCL) | 35.5 | |
| J | Small particle size Acrylic (2% styrene) (low MW, highly swellable) | 37 | |
| K | 100% Acrylic; all-acrylic backbone | 43 | ≤25 |
| L | Styrene Acrylic | 42 | ≤50 |
| M | Styrene acrylic | 45 | |
| N | Opaque Polymer | 30.5 | N/A |
| O | styrene acrylic | 47 | <50 |
| P | styrene acrylic | 50 | ≤25 |
| Q | Acrylic co-polymer (SCL) | 44 | |
| R | Modified acrylic (SCL) | 45 | |
| S | Aliphatic Urethane, (SCL) 25 g/l VOC | 35 | |
| T | Modified acrylic copolymer | 45 | ≤25 |
| U | 100% acrylic | 45 | ≤80 |
| V | Acrylic Modified Long Oil Alkyd | 61 | |

Fillers

In various embodiments, the at least one filler may be selected to improve opacity and reduce the amount of costly functional pigments required. In some embodiments, the at least one filler is selected to act as an extender by spacing the functional pigment particles through the coating and improving the hiding power of the functional pigments. However, generally an extender will have less hiding power than a pigment, and a balance should be reached between pigments (higher cost, higher hiding power) and filler extenders (lower cost, lower hiding power). The at least one filler may include clays, talcs, wollastonites, $CaCO_3$, Zinc Stearate, or combinations thereof. Each filler will have an associated (average) particle size and oil absorption. In some embodiments, the at least one filler is selected to have a low oil absorption value so as to not substantially interfere with polymer film formation while maintaining adequate dispersion in the coating composition.

In some embodiments, the at least one filler comprises particles having a "platy" shape. Platy particles are generally understood to be those having a substantially flat particle shape. A filler made up of platy particles can provide improved mechanical properties to a coating.

In some embodiments, the at least one filler can include a clay such as Kaolin clay. Kaolin clays include a layered silicate mineral, with a layer of silica linked to a layer of alumina, having the formula $Al_2Si_2O_5(OH)_4$. A Kaolin clay may be hydrated or may be dried either partially or completely (e.g., by calcining). Kaolin clays are generally characterized by a platy particulate. A Kaolin clay, particularly a calcined Kaolin clay, may also act as an extender. A non-limiting example of a hydrated Kaolin clay is Dixie Clay®. Another example of a clay is an Attapulgite clay. An Attapulgite clay is a hydrous magnesium aluminum-silicate with a three dimensional chain structure. An Attapulgite clay offers dispersability and effective thixotropic thickening which aids in viscosity and sag control of paint. Without wishing to be limited by theory, it is thought that thixotropy with these "thickeners" is developed by charge attraction on the particle surface, hydrogen bonding, and the entrapment of liquid within a chain-like network. Surface coating compositions formulated with Attapulgite clay tends to form a gel-like structure at rest, yet when sheared, become less viscous.

In some embodiments, the fillers can include talc, a soft mineral of hydrated magnesium sulfate having a layer of magnesium-oxygen/hydroxyl between two layers of silicon-oxygen, and having the formula $Mg_3Si_4O_{10}(OH)_2$. Generally, talc is soft, platy, hydrophobic and chemically inert. Talc deposits can be divided into two main types: talc-chlorite and talc-carbonate. Talc-chlorite ore bodies consist mainly of talc (sometimes 100%) and chlorite, which is hydrated magnesium and aluminum silicate. Chlorite is lamellar, soft and organophilic like talc. Talc-carbonate ore bodies are mainly composed of talc carbonate and traces of chlorite. Carbonate is typically magnesite (magnesium carbonate) or dolomite (magnesium and calcium carbonate). An example of a talc is Talcron® MP 1250.

In some embodiments, the fillers can include limestones, or chalks. Limestone has the chemical formula $CaCO_3$. Limestones generally are characterized by a bright appearance and exhibit low oil absorption. As provided herein, a limestone particle may be made by grinding or by precipitation. Limestone filler particles may be coated, for example, by stearic acid.

In some embodiments, the fillers can include zinc stearate. Zinc Stearate is a zinc salt of distilled, hydrogenated fatty acids. Zinc Stearate is commonly used as a filler pigment, and/or neutralizer in a surface coating composition.

In some embodiments, the fillers can include wollastonites, which are calcium silicate minerals. Wollastonites are generally characterized by low oil absorption.

In various embodiments, the filler may be selected from those provided in Table 3. In further embodiments, the at least one filler includes a combination of fillers selected from those provided in Table 3. In certain embodiments, the combination of fillers includes a talc having an oil absorption value of about 26 to about 53, $CaCO_3$ having an oil absorption value of about 11 to about 15, and a Kaolin clay having an oil absorption value of about 30 to about 42.

TABLE 3

| Filler | Material(s) | Particle shape | Oil Absorption (g oil/100 g filler) | Mean Particle size (μm) or mesh |
|---|---|---|---|---|
| A | talc | Platy | 53 | 1.2 |
| B | talc | Platy | 26 | 8 |
| C | talc | Platy | 28 | 10 |
| D | Wollastonite | Acicular | 30 | 4.5 |
| E | Calcium Carbonate | Calcite | 15 | 3 |
| F | Calcium Carbonate/ $TiO_2$ blend | Round | 43 | 1 |
| G | Talc/Carbonate: 60/40 | Calcite and Platy | 29 | 7 |
| H | Talc/Carbonate: 50/50 | Calcite and Platy | 27 | 9 |
| I | Talc/Carbonate: 60/40 | Calcite and Platy | 27 | 9 |
| J | Calcium Carbonate | Calcite | 18 | 2.0-2.5 |
| K | Calcium Carbonate | Calcite | 16 | 3.5 |
| L | Calcium Carbonate | Calcite | 14 | 6.5-8.5 |
| M | Calcium Carbonate | Calcite | 11 | 12.0-13.0 |
| N | Mica | Platy | 53 | |
| O | Mica | Platy | 65 | |
| P | Mica | Platy | 65 | |

TABLE 3-continued

| Filler | Material(s) | Particle shape | Oil Absorption (g oil/100 g filler) | Mean Particle size (µm) or mesh |
|---|---|---|---|---|
| Q | Kaolin Clay | Platy | 42 | 0.2 |
| R | Kaolin Clay | Platy | 41 | 50.8 µm (4.0 Hegman Fineness =) |
| S | Kaolin Clay | Platy | 60 | 0.5 |
| T | Kaolin Clay | Platy | 30 | 1.1 |
| U | Kaolin Clay | Platy | 60 | 1.5 |
| V | Filler pigment | N/A | N/A | 40 mesh (400 µm) |

Additives

In various embodiments, the additives may be chosen from suitable materials, such as rheology modifiers, dispersants, mar and slip additives, surfactants, defoamers, buffers, preservatives, stain blockers, coalescents, flash rust inhibitors, freeze-thaw stabilizers, and biocides. In some embodiments, a formulation can include a dispersing agent, a surfactant, a defoamer, a biocide, a mar and slip additive, a pH adjuster, and a rheology modifier. The additive may be characterized by its mineral or chemical constituency. Generally, the additive may be an organic material, such as a polymeric material (for example, hydroxyethylcellulose) or a non-polymeric organic material (for example, a glycol), or a mineral (for example, a clay).

An additive may fall into one or more of a number of subcategories. An additive may act as a rheology modifier. A rheology modifier can be a thickener. Thickeners are used in emulsion paints to increase viscosity and hence improve flow and leveling of a film surface. Some thickeners contain hydrophobic functionalities which can interact with a dispersant. Appropriate viscosity at high shear is needed to provide correct brush drag for proper spreading rate and coverage uniformity. Associative thickeners are used for this purpose and, in general, are hydrophobically-modified water-soluble polymers. Examples of additives with thickeners properties include hydroxyethylcellulose or a hydrophobe modified ethoxylated-urethane polymer (HEUR). Some thickeners available from commercial sources include Rohm and Haas, under the product designations, RM-825, QR-708, RM-708, RM-825 and RM-1020; and Union Carbide, under the product designations, SCr-200, SCT-215, SCT-270, and SCT-275; and Dow under the product name Acrysol™ RM-2020 NPR.

An additive may act as a dispersant. A dispersant may slow flocculation of the pigment, improving film properties. A dispersant may have a proton donating component to achieve adsorption on the pigment surface and a hydrophobic portion to facilitate adsorption on the pigment surface and to provide sites for hydrophobic interaction with, for example, a thickener. In some embodiments, the dispersant can comprise a hydrophilic copolymer. Examples of additives that act as dispersants include TAMOL™ 2001, Tamol™ 165A, TAMOL™ 681 Dispersants, or those disclosed in WO 1993/009187 (29 Oct. 1992).

An additive may act against mar and slip. Slip is the tendency for an object to slide over a coating. A mar and slip additive to a surface coating composition generally reduces the coefficient of static friction of a resulting surface coating. Mar and slip additives increase the slip resistance of a surface, and in so doing decrease the probability that mild shear forces exerted on a coating will result in a permanent deformation, such as a scratch. Mar and slip additives reduce the amount of work transferred to the coating during contact, which enhances the abrasion resistance and protects the coating from wearing due to physical contact, such as rubbing. A mar and slip additive may reduce adhesion of a surface coating composition. An example of a mar and slip additive is Troysol™ MS-2.

An additive may act as a surfactant. A surfactant may help wet a dry pigment or filler to facilitate a good pigment dispersion. Examples of surfactants include Dow™ Triton x-100, BYK™ 348, and BASF™ Disponil AES 60.

An additive may act as a defoamer. A defoamer may help reduce the formation of bubbles in a surface coating. Examples of defoamers include BYK™ 023/024, DAPRO™ AP 7071, and Advantage™ AM 831.

An additive may act as a buffer (such as, for example, NH$_4$OH), a preservative, a stain blocker (such as, for example, zinc oxide), a flash rust inhibitor, a freeze-thaw stabilizer (such as a glycol, for example, propylene glycol), and/or a biocide (such as a fungicide; for example, Nuosept 95). In some embodiments, the biocide can comprise a bicyclic oxazolidines solution.

In some embodiments, the additives may include a coalescent agent, wherein the coalescent agent functions to aid dispersion of the at least one pigment during film formation on the substrate.

In various embodiments, the one or more additives may be selected from those provided in Table 4.

TABLE 4

| Additive | Function | Properties |
|---|---|---|
| A | dispersing agent | hydrophilic copolymer |
| B | surfactant | Silicon surfactant polyether modified siloxane |
| C | defoamer | VOC free silicon defoamer |
| D | defoamer | VOC free all-purpose defoamer |
| E | rheology modifier/thickener | modified ethylene oxide urethane |
| F | biocide | Bicyclic oxazolidines solution |
| G | slip and mar | Modified siloxane copolymer |
| H | pH adjustment | NH$_4$OH |
| I | coalescent agent | VOC free broad spectrum coalescing solvent |

Pigment Volume Concentration

In various embodiments, the coating formulations have a low pigment volume concentration (PVC) in combination with functional pigment particles having pre-selected particle size range and oil absorption values. These factors act synergistically to provide improved mechanical adhesion and superior hide and holdout properties. Contrary to conventional wisdom, PVC in the lower range described herein is found to provide superior hide and holdout. The coating formulations provided herein exhibit improved strength while requiring lower pigment loading. Lower loading of expensive functional pigments reduces cost of the coating.

PVC is the volume occupied by pigments and fillers relative to the volume of the coating formulation, and generally is measured in percent. The PVC can be calculated by determining the volume percentage of solid particles in the system after film formation:

$$PVC = \frac{V_p + V_f}{V_p + V_f + V_b} \times 100\%$$

$V_p$: total volume of all pigments in the system (the sum of the mass of each pigment divided by its density).

$V_f$: total volume of all fillers in the system (the sum of the mass of each filler divided by its density).

$V_b$: volume of the non-volatile part of the polymers in the system (the sum of the mass of each polymer divided by its density). Intuitively, an increase in PVC should correlate to an increase in opacity and "hide" (described below) of a surface coating. This is because more pigment will be present for a given film thickness. However, the inventors have discovered that surprisingly, a low PVC can actually provide excellent hide and holdout in various formulations disclosed herein, if the pigment particles are within certain parameters of particle size and oil absorption.

Particle Oil Absorption

A low pigment loading combined with low oil absorption particles according to the coating formulations disclosed herein can provide a surface coating, such as primer, with superior hide, holdout, and mechanical characteristics, particularly on cementitious substrates. Conventional wisdom would dictate that low oil absorption particles would lead to poor cohesion, and thus mechanical strength of a coating, but the coatings of the present disclosure instead exhibit superior properties while using low oil absorption particles. Without wishing to be bound by theory, it is believed that the low oil absorption particles, as applied in the coating formulations presently disclosed, allow more polymer to come to the surface of a coating, providing better spacing, and thus more efficient utilization, of precious pigment particles. Thus, the coating formulations of the present disclosure permit lower pigment loading while maintaining hide and adhesion. Unless stated otherwise, an oil absorption value provided herein has units of grams of oil absorbed per 100 grams of particulate.

In one application, the coating formulation is waterborne and can be characterized by a $T_G$ of about 5 to about 30° C., an minimum film forming temperature (MFFT) of less than about 20° C., while substantially free from VOCs, providing a practical-to-use and environmentally friendly formulation. In another application, a surface coating, primed with a coating formulation disclosed herein and coated with a single coat of a top coat, will appear comparable to a surface coating coated with two coats of top coat with respect to gloss and color uniformity. The aforementioned visual effect is achieved with low functional pigment loading, and low pigment volume concentration (PVC), thus lowering the cost of the formulation. In further applications, a surface coating is characterized by superior topcoat wet adhesion.

In a preferred embodiment, the coating formulation includes less than about 10 wt % functional pigments, along with one or more fillers, wherein the one or more fillers includes a talc having an oil absorption of about 36 to about 53, $CaCO_3$ having an oil absorption of about 11 to about 15, and a Kaolin clay having an oil absorption of about 30 to about 42. In another preferred embodiment, the coating formulation includes less than about 10 wt % functional pigments, along with one or more fillers, wherein the one or more fillers includes a talc having an oil absorption of about 53, $CaCO_3$ having an oil absorption of about 15, and a Kaolin clay having an oil absorption of about 42. In another preferred embodiment, the coating formulation includes less than about 3 wt % functional pigments, along with one or more fillers, wherein the one or more fillers includes a talc having an oil absorption of about 36 to about 53, $CaCO_3$ having an oil absorption of about 11 to about 15, wollastonite having an oil absorption of about 30 to about 42, a $CaCO_3/TiO_2$ blend and one or more Kaolin clays. These coating formulations can be used as primers that provide superior hide and holdout while limiting loading of costly functional pigments.

In another preferred embodiment, the coating formulation includes about 20% to about 30% dry wt % of a filler having a particle size of about 12 to about 13 microns. In further embodiments, the filler is a $CaCO_3$. The coating formulation can be used as a primer that exhibits superior adhesion. In some embodiments, the coating can exhibit an adhesion of about 78% to about 100% in which the top coat loss is less than 22%, while in other embodiments, the coating can exhibit an adhesion of about 50% to about 100% in which the top coat loss is less than 50%. In some embodiments, the coating formulation supports a top coat loss of less than 85%. In some embodiments, the adhesion may be improved by including a particulate filler with an increased particle size, wherein the filler may be $CaCO_3$. In some embodiments, the improved adhesion may be achieved while pigment loading is maintained below about 3% dry wt %. In further embodiments, the improved adhesion may be achieved while pigment loading is maintained below about 9% dry wt %, or between about 2% to about 9% dry wt %.

In some embodiments, the coating formulation can include a dry wt % of total fillers of about 60%, about 65%, about 70%, about 75%, about 80%, about 85%, or values there between. In further embodiments, the coating formulation can include a dry wt % of total fillers of at least about 40%, at least about 45%, at least about 50%, at least about 55%, at least about 60%, at least about 65%, at least about 70%, or at least about 75%.

In some embodiments, the coating formulation can include a dry wt % of less than about 11 wt %, less than about 10 wt %, less than about 9 wt %, less than about 8 wt %, less than about 7 wt %, less than about 6 wt %, less than about 5 wt %, less than about 4 wt %, less than about 3 wt %, or less than about 2 wt %, $TiO_2$ pigment. In some further embodiments, the coating formulation includes at least about 2% functional pigment.

In some embodiments, the coating formulation can include dry wt % of total pigments of about 2%, about 2.5%, about 3%, about 4%, about 5%, about 6%, about 7%, about 8%, about 9%, about 10%, about 11%, about 12%, about 13%, about 14%, about 15%, or values there between. In further embodiments, the coating formulation can include a dry wt % of total pigments of less than about 0.1%, less than about 0.5%, less than about 1%, less than about 1.5%, less than about 2%, less than about 2.5%, less than about 3%, less than about 4%, less than about 5%, less than about 6%, less than about 7%, less than about 8%, less than about 9%, less than about 10%, less than about 11%, less than about 12%, less than about 13%, less than about 14%, or less than about 15%.

In some embodiments, the coating formulation can include a dry wt % of total additives of about 1%, about 2%, about 4% about 6% about 8% about 10% about 12% about 14%, about 15%, about 16%, about 18%, about 20%, about 22%, or values there between.

Surprisingly, such coating formulations provide superior ability to obscure irregularities and imperfections in the underlying cementitious substrate, and to resist penetration by a top coat, despite including low functional pigment loading. In some embodiments, the composition can be characterized by a Pigment Volume Concentration (PVC) from about 44% to about 58%. In some embodiments, a low PVC combined with low oil absorption particulate can provide a surface coating with superior hide, holdout, and mechanical characteristics.

The coating formulations disclosed herein can be used as part of the coating system for cementitious substrates. FIG. 1 illustrates a cementitious substrate 100, such as a fiber cement board, having a coating formulation disclosed herein applied to an exterior surface 110. The fiber cement board can be a siding, a plank, or the like. In this embodiment, the cementitious substrate 100 has an exterior coating system that includes a primer and a top coat. The dry primer comprises about 1 to 11 wt % of functional pigment, about 19 to 27 wt % polymers, about 60 to 75 wt % of fillers, and about 3 to about 7 wt % of additives, wherein the PVC is from about 44% to about 60%. The functional pigment can comprise $TiO_2$ having an oil absorption value of about 17 to about 30 and particle size range of about 0.1 μm to about 0.5 μm; the polymers can comprise an acrylic polymer; the fillers can comprise a talc having an oil absorption of about 36 to about 53 and a $CaCO_3$ having an oil absorption of about 11 to about 18. The coating system can have a wet adhesion of more than 78%. Advantageously, these coatings maintain superior mechanical properties. In some embodiments, the cementitious substrate is characterized by a holdout/gloss test difference of less than about 6. The coating formulations may also be applied to any other suitable substrates to form a surface coating, such as wood, composites, concrete, plastics, stucco.

The coating formulations may be compounded using manufacturing methods known in the art, such as dispersion, grinding, mixing, stirring, shaking, agitating, inverting, by any other suitable method, or by a combination of methods. The coating formulations may also be applied to a substrate using methods known in the art, such as flood coating, spraying, rolling or wiping.

In addition to hide and holdout, the coating formulations disclosed herein can be characterized by various other indicia. A coating formulation can be characterized by its minimum film forming temperature (MFFT). This is the minimum temperature at which a surface coating formulation, when applied to a substrate, forms a film. A film may seal the substrate surface, thereby slowing, minimizing, or preventing ingress into the substrate, or into the surface coating, for example, by a top coat or by environmental water. If a coating formulation is applied to a substrate below MFFT, a uniform film may not form because the surface coating is unevenly distributed over the substrate surface. Generally, above MFFT a surface coating will distribute evenly on a substrate surface, resulting in a uniform, or generally uniform, surface coating film. In some embodiments, the MFFT of the coating formulation is less than about 30° C., less than about 25° C., less than about 20° C., less than about 15° C., less than about 10° C., less than about 5° C., or less than about 0° C.

In general, a coating formulation may include volatile organic compounds (VOCs). VOCs are generally any small carbon-containing molecule that is subject to vaporization under ambient conditions. In some embodiments, the coating formulation may be substantially free from VOCs. In further embodiments, the coating formulation may include no detectable VOCs.

A coating formulation may be characterized by the ability to adhere and bond to the substrate and the top coat or adjacent coating layers. In some embodiments, the coating formulation is characterized by an adhesion more than about 95%, more than about 90%, more than about 85%, more than about 80%, more than about 75%, or more than about 70%.

In some embodiments, a coating formulation can be characterized by an opacity of about 90% to about 100%. In further embodiments, a coating formulation can be characterized by an opacity of at least about 85%.

A coating formulation may be characterized by its gloss. Generally, an absolute gloss difference of 6 or less is a good result because a gloss difference of 6 is hardly discernable to the naked eye, while an absolute gloss difference of 5 or less is not discernable to the naked eye. Gloss is closely related to holdout. In some embodiments, a coating formulation can be characterized by a gloss of less than about 5. In further embodiments, a coating formulation can be characterized by a gloss of less than about 6.

A coating formulation may be characterized by its porosity. In some embodiments, a coating formulation can be characterized by a porosity less than about 40%. In further embodiments, a coating formulation can be characterized by a porosity of less than about 36%. In still further embodiments, a coating formulation can be characterized by a porosity of less than about 16%.

Another property of a coating formulation is dry film thickness (DFT). DFT is the thickness of the film after volatile components have evaporated or otherwise departed from the surface coating. In some embodiments, the minimum DFT is about 0.5 mm. In further embodiments, the DFT is between about 0.5 mm and about 1.0 mm. Unless stated otherwise, the DFT of a coating film provided herein is 1 mm.

Another property of a coating formulation is glass transition temperature ($T_G$). The $T_G$ is the temperature range in which a polymer, or composition including one or more polymers, transitions from a hard, glassy material to a soft, rubbery material. In some embodiments, the coating formulation can be characterized by a $T_G$ of less than about 20° C., less than about 25° C., less than about 30° C., less than about 40° C., less than about 50° C., less than about 80° C. or values therebetween. In further embodiments, a surface coating can be characterized by a $T_G$ of about 5° C. to about 30° C.

EXAMPLES

Example 1: Sample Compositions

Various samples of coating formulations were prepared according to the following components and proportions as set out in samples 1 to 36 as presented in tables 5 to 18 below.

A typical procedure for preparing a surface coating composition is as follows: A grind is prepared and added to a letdown and final adjustments are made as necessary to form the surface coating composition.

In one example, a grind is formed as follows: water (160 g), and additives, for example, Additive A (2.5 g, dispersing agent), Additive B (0.8 g, a surfactant), Additive C (0.2 g, a defoamer), Additive D (0.3 g, a defoamer), and Additive E (23.5 g, a rheology modifier/thickener) are combined together to form a mixture. A pigment package including Pigment A (45 g), Pigment D (0.5 g), and Pigment E (1 g) is added to the mixture with stirring for 5 minutes. A filler package including Filler A (30 g), Filler E (145 g), Filler U (75 g), and Filler V (5 g) are then added to the mixture over one minute with continued stirring. Then stirring is reduced.

The letdown is formed as follows; a polymer package, for example, Polymer B (dry weight 111.19 g) and Polymer D (74.4 g) are combined. Further additives, for example, Additive F (2.52 g, a biocide), Additive G (2.52 g, slip and mar), and Additive H (3 g, a pH adjuster) are added to the polymer mixture with continued stirring thus forming the letdown.

The grind is then added to the letdown.

Further adjustments, including for example, additional water (24.93 g) and optionally further additives, for example, Additive E (24 g) are added as necessary. It is to be understood that the various samples outlined below can be prepared in a similar manner to the method outlined above.

The following examples provide various non-limiting formulations. Unless otherwise stated, a wt % is the percent weight of the component of the formulation disregarding the weight of water or other solvent.

Comparative Sample 1 exhibits typical hide and holdout as a surface coating. The components of Comparative Sample 1 are provided in Table 5.

TABLE 5

| Item: | Function | Weight gm | Dry wt % |
|---|---|---|---|
| Water | media | 184.93 | |
| Additive A | dispersing agent | 2.50 | 0.62 |
| Additive B | surfactant | 0.80 | 0.20 |
| Additive C | defoamer | 0.20 | 0.05 |
| Additive D | defoamer | 0.30 | 0.07 |
| Additive E | rheology modifier/thickener | 47.50 | 2.36 |
| Additive F | biocide | 2.52 | 0.31 |
| Additive G | slip and mar | 3.13 | 0.19 |
| Additive H | pH adjustment | 3.00 | 0.74 |
| Total Additives | | | 4.54 |
| Pigment A | functional Pigment | 45.00 | 11.16 |
| Pigment D | functional Pigment | 0.50 | 0.12 |
| Pigment E | functional Pigment | 1.00 | 0.25 |
| Total Pigments | | | 11.53 |
| Filler A | filler | 30.00 | 7.44 |
| Filler E | filler | 145.00 | 35.95 |
| Filler U | filler | 75.00 | 18.59 |
| Filler V | filler | 5.00 | 1.24 |
| Total fillers | | | 63.22 |
| Polymer B | polymer | 111.19 | 12.41 |
| Polymer D | polymer | 74.40 | 8.30 |
| Total Polymers | | | 20.71 |
| Total | | | 100.00 |

The components of Sample 2 are provided in Table 6.

TABLE 6

| Item: | Function | Weight gm | Dry wt % |
|---|---|---|---|
| Water | media | 270.01 | |
| Additive A | dispersing agent | 2.50 | 0.56 |
| Additive B | surfactant | 0.80 | 0.18 |
| Additive C | defoamer | 0.20 | 0.04 |
| Additive D | defoamer | 0.30 | 0.07 |
| Additive E | rheology modifier/thickener | 47.00 | 2.09 |
| Additive F | biocide | 2.52 | 0.28 |
| Additive G | slip and mar | 3.13 | 0.28 |
| Additive H | pH adjustment | 2.60 | 0.58 |
| Total Additives | | | 4.08 |
| Pigment A | functional Pigment | 25.00 | 5.57 |
| Pigment B | functional Pigment | 20.00 | 4.45 |

TABLE 6-continued

| Item: | Function | Weight gm | Dry wt % |
|---|---|---|---|
| Pigment D | functional Pigment | 0.60 | 0.13 |
| Pigment E | functional Pigment | 1.09 | 0.24 |
| Total Pigments | | | 10.40 |
| Filler A | filler | 30.00 | 6.68 |
| Filler E | filler | 85.00 | 18.93 |
| Filler D | filler | 40.00 | 8.91 |
| Filler F | filler | 30.00 | 6.68 |
| Filler Q | filler | 30.00 | 6.68 |
| Filler U | filler | 75.00 | 16.70 |
| Filler V | filler | 5.00 | 1.11 |
| Total fillers | | | 65.70 |
| Polymer K | polymer | 207.00 | 19.82 |
| Total Polymers | | | 19.82 |
| Total | | | 100.00 |

The components of Sample 3 are provided in Table 7.

TABLE 7

| Item: | Function | Weight gm | Dry wt % |
|---|---|---|---|
| Water | media | 253.80 | |
| Additive A | dispersing agent | 2.50 | 0.60 |
| Additive B | surfactant | 0.80 | 0.19 |
| Additive C | defoamer | 0.20 | 0.05 |
| Additive D | defoamer | 0.30 | 0.07 |
| Additive E | rheology modifier/thickener | 47.00 | 2.25 |
| Additive F | biocide | 2.52 | 0.30 |
| Additive G | slip and mar | 3.13 | 0.19 |
| Additive H | pH adjustment | 2.60 | 0.6 |
| Total Additives | | | 4.27 |
| Pigment A | functional Pigment | 25.00 | 5.98 |
| Pigment B | functional Pigment | 20.00 | 4.78 |
| Pigment D | functional Pigment | 0.60 | 0.14 |
| Pigment E | functional Pigment | 1.09 | 0.26 |
| Total Pigments | | | 11.16 |
| Filler A | filler | 30.00 | 7.17 |
| Filler E | filler | 55.00 | 13.15 |
| Filler R | filler | 40.00 | 9.56 |
| Filler F | filler | 30.00 | 7.17 |
| Filler Q | filler | 30.00 | 7.17 |
| Filler U | filler | 75.00 | 17.93 |
| Filler V | filler | 5.00 | 1.20 |
| Total fillers | | | 63.36 |
| Polymer K | polymer | 103.00 | 10.59 |
| Polymer J | polymer | 120.00 | 10.62 |
| Total Polymers | | | 21.21 |
| Total | | | 100.00 |

The components of Sample 4 are provided in Table 8.

TABLE 8

| Item: | Function | Weight gm | Dry wt % |
|---|---|---|---|
| Water | media | 253.80 | |
| Additive A | dispersing agent | 2.50 | 0.60 |
| Additive B | surfactant | 0.80 | 0.19 |
| Additive C | defoamer | 0.20 | 0.05 |
| Additive D | defoamer | 0.30 | 0.07 |
| Additive E | rheology modifier/thickener | 47.00 | 2.25 |

TABLE 8-continued

| Item: | Function | Weight gm | Dry wt % |
|---|---|---|---|
| Additive F | biocide | 2.52 | 0.30 |
| Additive G | slip and mar | 3.13 | 0.19 |
| Additive H | pH adjustment | 2.60 | 0.68 |
| Total Additives | | | 4.32 |
| Pigment A | functional Pigment | 25.00 | 5.97 |
| Pigment B | functional Pigment | 20.00 | 4.78 |
| Pigment D | functional Pigment | 0.60 | 0.14 |
| Pigment E | functional Pigment | 1.09 | 0.26 |
| Total Pigments | | | 11.15 |
| Filler A | filler | 70.00 | 16.72 |
| Filler E | filler | 45.00 | 10.75 |
| Filler R | filler | 40.00 | 9.56 |
| Filler Q | filler | 30.00 | 7.17 |
| Filler U | filler | 75.00 | 17.92 |
| Filler V | filler | 5.00 | 1.19 |
| Total fillers | | | 63.31 |
| Polymer K | polymer | 103.00 | 10.61 |
| Polymer J | polymer | 120.00 | 10.61 |
| Total Polymers | | | 21.22 |
| Total | | | 100.00 |

The components of Sample 5 are provided in Table 9.

TABLE 9

| Item: | Function | Weight gm | Dry wt % |
|---|---|---|---|
| Water | media | 219.85 | |
| Additive A | dispersing agent | 2.50 | 0.51 |
| Additive B | surfactant | 0.80 | 0.16 |
| Additive C | defoamer | 0.20 | 0.04 |
| Additive D | defoamer | 0.30 | 0.06 |
| Additive E | rheology modifier/thickener | 47.00 | 1.93 |
| Additive F | biocide | 2.52 | 0.26 |
| Additive G | slip and mar | 3.13 | 0.16 |
| Additive H | pH adjustment | 2.60 | 0.53 |
| Total additives | | | 3.67 |
| Pigment A | functional Pigment | 25.00 | 5.14 |
| Pigment B | functional Pigment | 20.00 | 4.11 |
| Pigment D | functional Pigment | 0.60 | 0.12 |
| Pigment E | functional Pigment | 1.09 | 0.22 |
| Total Pigments | | | 9.60 |
| Filler A | filler | 30.00 | 6.17 |
| Filler E | filler | 85.00 | 17.48 |
| Filler R | filler | 40.00 | 8.22 |
| Filler F | filler | 30.00 | 6.17 |
| Filler Q | filler | 30.00 | 6.17 |
| Filler U | filler | 75.00 | 15.42 |
| Filler V | filler | 5.00 | 1.03 |
| Total fillers | | | 60.65 |
| Polymer K | polymer | 295.00 | 26.08 |
| Total polymers | | | 26.08 |
| Total | | | 100.00 |

The components of Sample 6 are provided in Table 10.

TABLE 10

| Item: | Function | Weight gm | Dry wt % |
|---|---|---|---|
| Water | media | 276.22 | |
| Additive A | dispersing agent | 2.50 | 0.55 |
| Additive B | surfactant | 0.80 | 0.18 |
| Additive C | defoamer | 0.20 | 0.04 |
| Additive D | defoamer | 0.30 | 0.07 |
| Additive E | rheology modifier/thickener | 47.00 | 2.07 |
| Additive F | biocide | 2.52 | 0.28 |

TABLE 10-continued

| Item: | Function | Weight gm | Dry wt % |
|---|---|---|---|
| Additive G | slip and mar | 3.13 | 0.17 |
| Additive H | pH adjustment | 2.60 | 0.57 |
| Total additives | | | 3.92 |
| Pigment A | functional Pigment | 25.00 | 5.50 |
| Pigment B | functional Pigment | 20.00 | 4.40 |
| Pigment D | functional Pigment | 0.60 | 0.13 |
| Pigment E | functional Pigment | 1.09 | 0.24 |
| Total Pigments | | | 10.27 |
| Filler A | filler | 30.00 | 6.60 |
| Filler E | filler | 85.00 | 18.69 |
| Filler D | filler | 40.00 | 8.80 |
| Filler F | filler | 30.00 | 6.60 |
| Filler Q | filler | 30.00 | 6.60 |
| Filler T | filler | 75.00 | 16.49 |
| Filler V | filler | 5.00 | 1.10 |
| Total fillers | | | 64.87 |
| Polymer C | polymer | 207.00 | 20.94 |
| Total polymers | | | 20.94 |
| Total | | | 100.00 |

The components of Sample 7 are provided in Table 11.

TABLE 11

| Item: | Function | Weight gm | Dry wt % |
|---|---|---|---|
| Water | media | 276.22 | |
| Additive A | dispersing agent | 2.50 | 0.56 |
| Additive B | surfactant | 0.80 | 0.18 |
| Additive C | defoamer | 0.20 | 0.04 |
| Additive D | defoamer | 0.30 | 0.07 |
| Additive E | rheology modifier/thickener | 47.00 | 2.09 |
| Additive F | biocide | 2.52 | 0.28 |
| Additive G | slip and mar | 3.13 | 0.17 |
| Additive H | pH adjustment | 2.60 | 0.58 |
| Total additives | | | 3.97 |
| Pigment A | functional Pigment | 5.00 | 1.11 |
| Pigment B | functional Pigment | 20.00 | 4.45 |
| Pigment D | functional Pigment | 0.60 | 0.13 |
| Pigment E | functional Pigment | 1.09 | 0.24 |
| Total Pigments | | | 5.93 |
| Filler A | filler | 30.00 | 6.67 |
| Filler E | filler | 85.00 | 18.90 |
| Filler M | filler | 20.00 | 4.45 |
| Filler D | filler | 40.00 | 8.89 |
| Filler F | filler | 30.00 | 6.67 |
| Filler Q | filler | 30.00 | 6.67 |
| Filler T | filler | 75.00 | 16.68 |
| Total fillers | | | 68.93 |
| Polymer C | polymer | 207.00 | 21.17 |
| Total polymers | | | 21.17 |
| Total | | | 100.00 |

The components of Sample 8 are provided in Table 12.

TABLE 12

| Item: | Function | Weight gm | Dry wt % |
|---|---|---|---|
| Water | media | 276.22 | |
| Additive A | dispersing agent | 2.50 | 0.55 |
| Additive B | surfactant | 0.80 | 0.18 |
| Additive C | defoamer | 0.20 | 0.04 |
| Additive D | defoamer | 0.30 | 0.07 |
| Additive E | rheology modifier/thickener | 47.00 | 2.07 |
| Additive F | biocide | 2.52 | 0.28 |
| Additive G | slip and mar | 3.13 | 0.17 |
| Additive H | pH adjustment | 2.60 | 0.57 |
| Total additives | | | 3.92 |
| Pigment B | functional Pigment | 5.00 | 1.10 |
| Pigment D | functional Pigment | 0.60 | 0.13 |

TABLE 12-continued

| Item: | Function | Weight gm | Dry wt % |
|---|---|---|---|
| Pigment E | functional Pigment | 1.09 | 0.24 |
| Total Pigments | | | 1.47 |
| Filler A | filler | 30.00 | 6.60 |
| Filler M | filler | 130.00 | 28.59 |
| Filler D | filler | 40.00 | 8.80 |
| Filler F | filler | 30.00 | 6.60 |
| Filler Q | filler | 30.00 | 6.60 |
| Filler T | filler | 75.00 | 16.49 |
| Total fillers | | | 73.67 |
| Polymer C | polymer | 207.00 | 20.94 |
| Total polymers | | | 20.94 |
| Total | | | 100.00 |

The components of Sample 9 are provided in Table 13.

TABLE 13

| Item: | Function | Weight gm | Dry wt % |
|---|---|---|---|
| Water | media | 254.08 | |
| Additive A | dispersing agent | 2.50 | 0.54 |
| Additive B | surfactant | 0.80 | 0.17 |
| Additive C | defoamer | 0.20 | 0.04 |
| Additive D | defoamer | 0.30 | 0.06 |
| Additive E | rheology modifier/thickener | 47.00 | 2.03 |
| Additive F | biocide | 2.52 | 0.27 |
| Additive H | pH adjustment | 2.60 | 0.56 |
| Total additives | | | 3.69 |
| Pigment A | functional Pigment | 20.00 | 4.32 |
| Pigment B | functional Pigment | 20.00 | 4.32 |
| Pigment D | functional Pigment | 0.60 | 0.13 |
| Pigment E | functional Pigment | 1.09 | 0.24 |
| Total Pigments | | | 9.01 |
| Filler A | filler | 30.00 | 6.48 |
| Filler M | filler | 85.00 | 18.37 |
| Filler D | filler | 40.00 | 8.64 |
| Filler F | filler | 30.00 | 6.48 |
| Filler Q | filler | 30.00 | 6.48 |
| Filler T | filler | 75.00 | 16.20 |
| Total fillers | | | 62.66 |
| Polymer C | polymer | 248.00 | 24.65 |
| Total polymers | | | 24.65 |
| Total | | | 100.00 |

The components of Sample 10 are provided in Table 14.

TABLE 14

| Item: | Function | Weight gm | Dry wt % |
|---|---|---|---|
| Water | media | 276.22 | |
| Additive A | dispersing agent | 2.50 | 0.56 |
| Additive B | surfactant | 0.80 | 0.18 |
| Additive C | defoamer | 0.20 | 0.05 |
| Additive D | defoamer | 0.30 | 0.07 |
| Additive E | rheology modifier/thickener | 47.00 | 2.12 |
| Additive F | biocide | 2.52 | 0.28 |
| Additive H | pH adjustment | 2.60 | 0.59 |
| Total additives | | | 3.84 |
| Pigment A | functional Pigment | 20.00 | 4.50 |
| Pigment B | functional Pigment | 20.00 | 4.50 |
| Pigment D | functional Pigment | 0.60 | 0.14 |
| Pigment E | functional Pigment | 1.09 | 0.25 |
| Total Pigments | | | 9.39 |
| Filler A | filler | 30.00 | 6.76 |
| Filler L | filler | 85.00 | 19.15 |
| Filler D | filler | 40.00 | 9.01 |
| Filler F | filler | 30.00 | 6.76 |
| Filler Q | filler | 30.00 | 6.76 |
| Filler T | filler | 75.00 | 16.89 |
| Total fillers | | | 65.32 |

TABLE 14-continued

| Item: | Function | Weight gm | Dry wt % |
|---|---|---|---|
| Polymer C | polymer | 207.00 | 21.45 |
| Total polymers | | | 21.45 |
| Total | | | 100.00 |

The components of Sample 11 are provided in Table 15.

TABLE 15

| Item: | Function | Weight gm | Dry wt % |
|---|---|---|---|
| Water | media | 254.08 | |
| Additive A | dispersing agent | 2.50 | 0.54 |
| Additive B | surfactant | 0.80 | 0.17 |
| Additive C | defoamer | 0.20 | 0.04 |
| Additive D | defoamer | 0.30 | 0.06 |
| Additive E | rheology modifier/thickener | 61.50 | 2.64 |
| Additive F | biocide | 2.52 | 0.27 |
| Additive H | pH adjustment | 2.60 | 0.56 |
| Total additives | | | 4.29 |
| Pigment A | functional Pigment | 5.00 | 1.07 |
| Pigment B | functional Pigment | 5.00 | 1.07 |
| Pigment D | functional Pigment | 0.60 | 0.13 |
| Pigment E | functional Pigment | 1.09 | 0.23 |
| Total Pigments | | | 2.51 |
| Filler A | filler | 30.00 | 6.44 |
| Filler M | filler | 115.00 | 24.69 |
| Filler D | filler | 40.00 | 8.59 |
| Filler F | filler | 30.00 | 6.44 |
| Filler Q | filler | 30.00 | 6.44 |
| Filler T | filler | 75.00 | 16.10 |
| Total fillers | | | 68.71 |
| Polymer C | polymer | 248.00 | 24.49 |
| Total polymers | | | 24.49 |
| Total | | | 100.00 |

The components of Sample 12 are provided in Table 16.

TABLE 16

| Item | Function | Weight gm | Dry wt % |
|---|---|---|---|
| Water | media | 254.08 | |
| Additive A | dispersing agent | 2.50 | 0.53 |
| Additive B | surfactant | 0.80 | 0.17 |
| Additive C | defoamer | 0.20 | 0.04 |
| Additive D | defoamer | 0.30 | 0.06 |
| Additive E | rheology modifier/thickener | 61.50 | 2.61 |
| Additive F | biocide | 2.52 | 0.27 |
| Additive H | pH adjustment | 2.60 | 0.55 |
| Additive I | coalescent | 5.70 | 1.21 |
| Total additives | | | 5.48 |
| Pigment A | functional Pigment | 5.00 | 1.06 |
| Pigment B | functional Pigment | 5.00 | 1.06 |
| Pigment D | functional Pigment | 0.60 | 0.13 |
| Pigment E | functional Pigment | 1.09 | 0.23 |
| Total Pigments | | | 2.48 |
| Filler A | filler | 30.00 | 6.36 |
| Filler M | filler | 115.00 | 24.39 |
| Filler D | filler | 40.00 | 8.48 |
| Filler F | filler | 30.00 | 6.36 |
| Filler Q | filler | 30.00 | 6.36 |
| Filler T | filler | 75.00 | 15.91 |
| Total fillers | | | 67.88 |
| Polymer C | polymer | 248.00 | 24.20 |
| Total polymers | | | 24.20 |
| Total | | | 100.00 |

The components of Sample 13 are provided in Table 17.

TABLE 17

| Item | Function | Weight gm | Dry wt % |
|---|---|---|---|
| Water | media | 254.08 | |
| Additive A | dispersing agent | 2.50 | 0.54 |
| Additive B | surfactant | 0.80 | 0.17 |
| Additive C | defoamer | 0.20 | 0.04 |
| Additive D | defoamer | 0.30 | 0.06 |
| Additive E | rheology modifier/thickener | 47.00 | 2.63 |
| Additive F | biocide | 2.52 | 0.27 |
| Additive H | pH adjustment | 2.60 | 0.56 |
| Additive I | coalescent | 1.14 | 0.24 |
| Total additives | | | 4.52 |
| Pigment A | functional Pigment | 5.00 | 1.07 |
| Pigment B | functional Pigment | 5.00 | 1.07 |
| Pigment D | functional Pigment | 0.60 | 0.13 |
| Pigment E | functional Pigment | 1.09 | 0.23 |
| Total Pigments | | | 2.50 |
| Filler A | filler | 30.00 | 6.43 |
| Filler M | filler | 115.00 | 24.63 |
| Filler D | filler | 40.00 | 8.57 |
| Filler F | filler | 30.00 | 6.43 |
| Filler Q | filler | 30.00 | 6.43 |
| Filler T | filler | 75.00 | 16.06 |
| Total fillers | | | 68.54 |
| Polymer C | polymer | 248.00 | 24.44 |
| Total polymers | | | 24.44 |
| Total | | | 100.00 |

The components of Sample 14 are provided in Table 18.

TABLE 18

| Item | Function | Weight gm | Dry wt % |
|---|---|---|---|
| Water | media | 254.08 | |
| Additive A | dispersing agent | 2.50 | 0.53 |
| Additive B | surfactant | 0.80 | 0.17 |
| Additive C | defoamer | 0.20 | 0.04 |
| Additive D | defoamer | 0.30 | 0.06 |
| Additive E | rheology modifier/thickener | 61.50 | 2.58 |
| Additive F | biocide | 2.52 | 0.26 |
| Additive H | pH adjustment | 2.60 | 0.55 |
| Additive I | coalescent | 10.26 | 2.16 |
| Total additives | | | 6.35 |
| Pigment A | functional Pigment | 5.00 | 1.05 |
| Pigment B | functional Pigment | 5.00 | 1.05 |
| Pigment D | functional Pigment | 0.60 | 0.13 |
| Pigment E | functional Pigment | 1.09 | 0.23 |
| Total Pigments | | | 2.46 |
| Filler A | filler | 30.00 | 6.30 |
| Filler M | filler | 115.00 | 24.16 |
| Filler D | filler | 40.00 | 8.40 |
| Filler F | filler | 30.00 | 6.30 |
| Filler Q | filler | 30.00 | 6.30 |
| Filler T | filler | 75.00 | 15.76 |
| Total fillers | | | 67.23 |
| Polymer C | polymer | 248.00 | 23.97 |
| Total polymers | | | 23.97 |
| Total | | | 100.00 |

Additional sample formulations are provided in Table 19. All samples were formulated with Pigment A 25 g, Pigment B 20 g, 0.6 g Pigment D, 1.1 g Pigment E, 5 g Filler V, 75 g Filler U and the additional components listed below.

TABLE 19

| Sample | Filler E CaCO$_3$ | Filler Talc | Filler R Clay | Filler F | Polymer (dry weight) | Other |
|---|---|---|---|---|---|---|
| 15 | 55 g | A 30 g | 40 g | 30 g | K 89 g | Filler Q 30 g |
| 16 | 55 g | A 30 g | 40 g | 30 g | K 89 g | Filler Q 30 g |
| 17 | 55 g | C 30 g | 40 g | 30 g | K 89 g | Filler Q 30 g |
| 18 | 85 g | A 30 g | 0 g | 0 g | K 89 g | Filler P 70 g |

Additional sample formulations are provided in Table 20. All samples included 0.6 g Pigment D, 1.1 g Pigment E and the additional components listed below. Polymer masses are wet mass.

TABLE 20

| Sample | Pigments A | C | B | Fillers E | A | R | F | Q | O | U | Polymer(s) |
|---|---|---|---|---|---|---|---|---|---|---|---|
| 19 | 43 | | | 90 | 30 | 30 | | | 30 | 75 | A 80 g, D 55 g, J 25 g, N 25 g |
| 20 | 43 | | | 90 | 30 | 30 | | | 30 | 75 | A 93 g, D 64 g, N 29 g |
| 21 | 43 | | | 85 | 30 | 45 | | | 40 | 75 | B 111 g, D 74 g |
| 22 | 25 | 20 | | 145 | 30 | | | | | 75 | B 111 g, D 74 g |
| 23 | 25 | | 20 | 145 | 30 | | | | | 75 | B 111 g, D 74 g |
| 24 | 25 | 20 | | 85 | 30 | | 30 | 30 | | 75 | B 139 g, D 93 g |
| 25 | 25 | 20 | | 85 | 30 | | 30 | 30 | | 75 | B 207 g |
| 26 | 25 | 20 | | 85 | 30 | | 30 | 30 | | 75 | F 207 g |
| 27 | 45 | | | 90 | 30 | | | 40 | | 100 | B 207 g |
| 28 | 45 | | | 65 | 30 | 40 | | | 40 | 75 | B 207 g |

Additional sample formulations are provided in Table 21. All samples included 30 g Filler A, 0.6 g Pigment D, 1.1 g Pigment E, and the additional components listed below. Masses are in grams. Polymer masses are wet mass.

TABLE 21

| Sample | Pigments A | B | Fillers E | A | R | F | Q | N | O | U | Polymer(s) |
|---|---|---|---|---|---|---|---|---|---|---|---|
| 29 | 45 | | 85 | 30 | 30 | | | | 30 | 75 | A 80 g, D 55 g, J 25 g, N 25 g |
| 30 | 25 | 20 | 85 | 30 | | 30 | 30 | | | 75 | A 111 g, D 74 g |
| 31 | 45 | | 115 | 30 | 30 | | | | | 75 | A 74 g, G 111 g |
| 32 | 45 | | 115 | 30 | | | | 30 | | 75 | A 207 g |
| 33 | 45 | 45 | 60 | 30 | 40 | | | | | 75 | F 207 g |
| 34 | 45 | 45 | 60 | 30 | 40 | | | | | 75 | H 207 g |
| 35 | 45 | | 145 | 30 | | | | | | 75 | A 149 g, D 93 g |
| 36 | 45 | | 145 | 30 | | | | | | 75 | A 167 g, D 111 g |
| 37 | 45 | | 115 | 30 | | | | 30 | | 75 | A 207 g |
| 38 | 45 | | 115 | 30 | | | | 40 | | 75 | I 291 g |
| 39 | 45 | | 85 | 30 | | | | | 70 | 75 | B 207 g |

Various tests were conducted on the sample formulations as outlined below. In some instances the tests were conducted on sample formulations when used as a surface coating composition as outlined in Examples 3 to 7 below. In each instance where the sample formulation was used as a surface coating composition, a fiber cement substrate of 3 foot×8¼ inch×¼ inch was spray coated with the appropriate surface coating composition and then dried.

Example 2: Oil Absorption

Oil absorption can be measured by the Gardner-Coleman method, according to ASTM D1483-95. Briefly, the weight of a filler or pigment used was a filler or pigment volume of about 3.0 mL. The weight was found by multiplying 3.0 mL by the specific gravity of the filler or pigment being tested. For example, a 20 g specimen was used for zinc oxide (3.6 mL×5.6 g/mL=20.2 g). The pigment, weighed to 0.01 g, was transferred to a glass container. Oil was added from the buret at the rate of about 1 drop per second, while stirring and "folding" the pigment continuously with the spatula. Dry pigment was exposed for the oil to strike. No rubbing or grinding was applied. As the particles of pigment became wetted, they collected in small lumps that gradually coalesced. As the coalescence proceeds, the rate of oil addition was reduced by at least half. The end point was reached when the lumps, with a rolling action from the spatula, collected into a single ball or the excess of oil smeared the wall of the container. Oil absorption, A, as grams of oil per 100 g of pigment, was calculated as follows:

$$A = 100 \times (M \times 0.93)/P$$

where: M=oil, mL, and P=pigment, g. 0.93 represents density of oil (in grams per milliliter).

Example 3: Hide/opacity

Hiding power ("hide") was measured according to ASTM D2805-11. Opacity is measured as the ratio of reflectance measurements on black and white hiding power charts expressed as a percentage. The reflectivity $R_\infty$ of the coating was determined from reflectance measurements on black and white hiding power charts. The scattering coefficient S of the coating was determined from $R_\infty$, and the reflectance $R_0$ and spreading rate $H_X$ of a film applied on black glass. The hiding power, $H_{0.08}$ of the coating was calculated from the reflectivity $R_\infty$ and the scattering coefficient S. As an optional procedure the contrast ratio C at a specified spreading rate $H_C$ was calculated from $R_\infty$ and S.

$$H_x = \frac{AND}{10M} = \overline{M} \quad S = f(R_0, R_\infty, H_x) \quad \text{Eq A1.2 of Annex A1}$$

$$H_{0.98} = f(S, C, R_\infty) \text{ where } C = 0.98 \quad \text{Eq A1.3 of Annex A1}$$

where D is paint density in g/mL, N is nonvolatile content as a decimal amount; A is template film area in cm²; n is the contrast ratio, the ratio of the reflectance of a film on a black substrate to that of an identical film on a white substrate; $C_W$—the contrast ratio with a white substrate of reflectance W (thus, $C_W = R_0/R_W$); C—the contrast ratio with a white substrate for which W=0.80 (thus, $C = R_0/R_{0.80}$); reflectance, n—the daylight luminous diffuse reflectance factor (specular reflection excluded), which may be expressed as a percent or a decimal fraction, the latter being preferred and usually required for mathematical calculations; reflectivity, $R_\infty$—the reflectance of film thick enough to have the same reflectance over both a black and a white substrate; $R_0$—the reflectance of a film on a black surface with a reflectance of 1% or less, which is effectively zero for the purpose of this test; W—the reflectance of a white substrate; $R_W$—the reflectance of a film applied on a white substrate of reflectance W; $R_{0.80}$—the reflectance of a film applied on a substrate having a reflectance of 80%, which is the standard white-substrate reflectance in paint technology; scattering coefficient, S—the ability of a material to internally scatter and thereby reflect light; expressed in this test method in the same units as spreading rate; spreading rate, H—film area per unit volume of coating, in this test method expressed in square meters per liter (m2/L); spreading rate, $H_X$—an experimentally determined value of H; spreading rate, $H_C$—value of H at a specified contrast ratio C. Table 22 provides opacity results for various samples as measured according to ASTM D2805.

TABLE 22

| Sample | Opacity [%] |
|---|---|
| 2 | 100 |
| 3 | 99.13 |
| 4 | 99.65 |
| 5 | 95.84 |
| 6 | 99 |
| 11 | 91 |
| 12 | 90 |
| 13 | 92 |
| 14 | 91 |
| 16 | 98.67 |
| 17 | 97.69 |
| 18 | 96.83 |
| 21 | 99.14 |
| 22 | 97.96 |
| 23 | 97.76 |
| 24 | 98.95 |
| 25 | 99.12 |
| 26 | 97.12 |
| 27 | 98.7 |
| 28 | 98.55 |
| 30 | 96.74 |
| 32 | 94.64 |
| 33 | 96.91 |
| 34 | 99.79 |
| 35 | 98.52 |
| 36 | 99.48 |
| 37 | 99.24 |
| 38 | 98.57 |
| 39 | 98.51 |

Example 4: Holdout/Gloss

Holdout was measured according to a modified ASTM D7786-13. Briefly, smooth fiber cement substrates were coated using a sample surface coating composition and allowed to dry to the DFT provided. The coated substrates were then each coated with a standard topcoat and allowed to become tacky (1$^{st}$ Coat), and with a second coat of topcoat (2$^{nd}$ Coat). Gloss measurements were taken over the 1$^{st}$ Coat sample and the 2$^{nd}$ Coat sample. The Absolute Difference in the gloss reading between the 1$^{st}$ Coat sample and the 2$^{nd}$ Coat sample is provided. The results shown below, indicate good enamel holdout. A smaller absolute difference indicates better enamel holdout, because it suggests a smooth, non-porous film was formed by the initial coating system, meaning that minimal topcoat material will be needed for complete coverage. Table 23 provides Gloss results for various Samples, where the 1$^{st}$ Coat and 2$^{nd}$ Coat results are averaged from four runs.

TABLE 23

| Sample | DFT (mm) | 1$^{st}$ Coat Average (n = 4) | 2$^{nd}$ Coat Average (n = 4) | Absolute Difference |
|---|---|---|---|---|
| 2 | 0.75 | 12.0 | 15.2 | 3.2 |
| 2 | 1 | 11.6 | 16.5 | 4.9 |
| 34 | 1 | 10.8 | 16.5 | 5.7 |

Example 5: Holdout/Porosity

Porosity was measured according to a modified ASTM D6583-13 by the following procedure: the test sample was applied to a preweighed nonporous panel, air dried, then reweighed to obtain the weight of the film. Mineral oil was applied to the surface of the film, allowed to absorb for a fixed period of time, and the excess removed by wiping. The test panel was then reweighed to determine the amount of mineral oil absorbed. Porosity was calculated from the weight ratio of absorbed oil to dry coating film and from previously determined values of non-volatile and density for the whole paint. Results for various samples are provided in Table 24.

TABLE 24

| Sample | Porosity |
|---|---|
| 12 | 15.8 |
| 13 | 14.7 |
| 14 | 12.3 |
| 19 | 28.9 |
| 20 | 27.3 |
| 21 | 21.1 |
| 22 | 22.2 |
| 23 | 22.5 |
| 24 | 18.0 |
| 25 | 25.0 |
| 27 | 36.4 |
| 28 | 28.7 |
| 29 | 25.2 |
| 30 | 26.7 |
| 31 | 27.0 |
| 32 | 27.4 |
| 33 | 14.2 |
| 34 | 22.3 |
| 35 | 19.5 |
| 36 | 27.9 |
| 37 | 31.5 |
| 38 | 22.0 |
| 39 | 25.6 |

Example 6: Adhesion

Adhesion was measured according to ASTM D3359, Standard Method for Measuring Adhesion by Tape Test. The test is based upon measuring the amount of paint removed from the sample surface when tape is pulled off with a standard amount of force. Substrates were coated with a surface coating composition according to sample number to 1 mm DFT, then coated with an exterior grade satin paint. The sample was then submerged for a period of time in water and adhesion of the exterior grade paint and primer formulation to the wet substrate was measured below. The number represents adhesion, in area %, of the combined coating system. In this instance, a lower number indicates better wet adhesion.

Components of the surface coating compositions were varied to determine effect on adhesion. Surprisingly, the adhesion increased as particle size of particulate was increased. Specifically, Filler M (12 micron average particle size) loading was increased while TiO$_2$ pigment loading was reduced. Adhesion results for samples with increasing particle size are presented below. All samples were formulated with 30 g Filler A, 40 g Filler D, 30 g Filler F, 30 g Filler Q, 75 g Filler T, 0.6 g Pigment D, 1.1 g Pigment E, and the additional components listed below. See Table 25.

TABLE 25

| Sample | Pigments | Fillers | Polymer (dry weight) | PVC (%) | Adhesion (avg) |
|---|---|---|---|---|---|
| 2 | A 25 g + B 20 g | E 85 g + U 75 g, V 5 g | K 89 g | 53.41 | 89 |
| 6 | A 25 g + B 20 g | E 85 g, V 5 g | C 95 g | 53.41 | |
| 7 | A 5 g + B 20g | E 85 g + M 20 g | C 95 g | 56.79 | |
| 8 | B 5 g | M 130 g | C 95 g | 57.41 | 37 |
| 10 | A 20 g + B 20 g | L 85 g | C 95 g | 56.03 | 82.4 |
| 11 | A 20 g + B 20 g | M 115 g | C 107 g | 53.41 | 24.3 |
| 12 | A 5 g + B 5 g | M 115 g | C 114 g | 52.30 | |
| 13 | A 5 g + B 5 g | M 115 g | C 114 g | 52.30 | 78.6 |
| 14 | A 5 g + B 5 g | M 115 g | C 114 g | 52.29 | 78.6 |

Example 7: PVC

PVC for various samples was measured according to methods provided herein, as given in Table 26.

TABLE 26

| Sample | PVC % |
|---|---|
| 2 | 53.41 |
| 3 | 54.36 |
| 4 | 54.36 |
| 5 | 44.81 |
| 6 | 56.68 |
| 7 | 56.79 |
| 8 | 57.41 |
| 9 | 51.54 |
| 10 | 56.03 |
| 11 | 52.31 |
| 12 | 52.3 |
| 13 | 52.3 |
| 14 | 52.29 |
| 16 | 53.81 |
| 26 | 49.39 |
| 33 | 48.05 |
| 34 | 50.33 |
| 36 | 45.32 |
| 41 44 | 52.06 |

While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other, modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A coating formulation for cementitious substrates, comprising:
   at least one pigment, said pigment comprising particles having a particle size range of about 0.1 µm to about 0.5 µm and an oil absorption value of about 17 to about 30;
   fillers, wherein at least some of the fillers are extenders that separate and spread out the particles of the pigment;
   at least one polymer;
   wherein the at least one polymer comprises an acrylic polymer;
   wherein the pigment volume concentration of the coating formulation is less than 60%;
   said coating formulation having an opacity value of at least 90% when applied to the cementitious substrate;
   wherein the pigment comprises $TiO_2$, wherein the fillers comprise talc having an oil absorption of about 26 to about 53, and wherein the fillers further comprise a $CaCO_3$ having an oil absorption of about 11 to about 18.

2. The coating formulation of claim 1, wherein the coating formulation comprises about 1 to about 11 dry wt % of the at least one pigment, about 19 to about 27 dry wt % of the at least one polymer, about 60 to about 75 dry wt % of the fillers, and further comprising about 3 to about 7 dry wt % of one or more additives, provided that the sum of the wt % of total pigments, wt % of total polymer, wt % of total fillers, and wt % of total additives in the formulation does not exceed 100%.

3. The coating formulation of claim 2, wherein the sum of the wt % of total pigments, wt % of total polymer, and wt % of total fillers is between 85 dry wt % and 94 dry wt %.

4. The coating formulation of claim 1, wherein the at least one pigment includes $TiO_2$ having an oil absorption value of about 17 and a particle size of about 0.1 µm to about 0.2 µm.

5. A waterborne functional composition, comprising:
   about 1 to about 11 dry wt % pigments, wherein the pigments comprise about 1 to about 11 dry wt % $TiO_2$ having an oil absorption value of about 17 to about 22;
   about 60 to about 75 dry wt % total fillers, wherein the fillers comprise about 20 to about 30 dry wt % of $CaCO_3$ characterized by about 12 µm to about 13 µm average particle size; and
   about 19 to about 27 dry wt % total polymers.

6. The composition of claim 5, wherein the composition is characterized by a pigment volume concentration of less than 60%.

7. The composition of claim 5, wherein the pigments further comprise a yellow iron oxide pigment or a black iron oxide pigment.

8. The composition of claim 5 further comprising one or more additives, wherein the one or more additives comprises one or more of a rheology modifier, a dispersant, a mar and slip, a surfactant, a defoamer, a buffer, a preservative, a stain blocker, a coalescent, a flash rust inhibitor, a freeze-thaw stabilizer, or a biocide.

9. The composition of claim 5, wherein the fillers comprise a talc having an oil absorption of about 53 and a particle size of about 1.2 µm.

10. The composition of claim 5, wherein the fillers comprise a $CaCO_3$ having an oil absorption of about 15 and a particle size of about 3 µm.

11. The composition of claim 5, wherein the fillers comprise a Kaolin clay having an oil absorption of about 42 and a particle size of about 0.2 µm.

12. The composition of claim 5, wherein the fillers comprise a Wollastonite.

13. The composition of claim 5, having a porosity value of less than about 36% when applied to a cementitious substrate.

* * * * *